United States Patent
Gandhi

(10) Patent No.: US 8,042,303 B2
(45) Date of Patent: Oct. 25, 2011

(54) SEAL HAVING AN ELECTROACTIVE ACTUATOR A FOR SLIDING GLASS WINDOW

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 348 days.

(21) Appl. No.: 12/173,062

(22) Filed: Jul. 15, 2008

(65) Prior Publication Data

US 2010/0011666 A1    Jan. 21, 2010

(51) Int. Cl.
*E05D 15/16* (2006.01)

(52) U.S. Cl. ............... 49/441; 49/440; 49/428; 49/415; 49/414

(58) Field of Classification Search .......... 49/414, 49/415, 440, 441, 428, 480.1, 489.1; 277/921
See application file for complete search history.

(56) References Cited

U.S. PATENT DOCUMENTS

| | | | |
|---|---|---|---|
| 2,132,104 A * | 10/1938 | Froeliger ........................ 49/415 |
| 5,943,823 A | 8/1999 | Yoshida et al. |
| 6,108,978 A * | 8/2000 | Jeong ............................. 49/440 |
| 6,305,125 B1 | 10/2001 | Nozaki et al. |
| 6,430,878 B2 | 8/2002 | Terasawa et al. |
| 6,708,450 B2 | 3/2004 | Tanaka et al. |
| 6,982,112 B2 | 1/2006 | Coran |
| 7,594,359 B2 * | 9/2009 | Keefe et al. ................. 49/498.1 |
| 2003/0188487 A1 | 10/2003 | Rasmussen |
| 2004/0255527 A1 | 12/2004 | Chen |
| 2005/0188622 A1 | 9/2005 | Nestell |
| 2005/0198904 A1 * | 9/2005 | Browne et al. ................. 49/374 |
| 2005/0198907 A1 * | 9/2005 | McKnight et al. ........... 49/475.1 |
| 2005/0230925 A1 * | 10/2005 | Browne et al. ............... 277/919 |
| 2005/0252091 A1 * | 11/2005 | Ku ............................... 49/428 |
| 2007/0117244 A1 | 5/2007 | Chen et al. |
| 2007/0220811 A1 | 9/2007 | Flendrig et al. |
| 2007/0222256 A1 | 9/2007 | Valentage et al. |

\* cited by examiner

*Primary Examiner* — Gregory J. Strimbu
(74) *Attorney, Agent, or Firm* — Gifford, Krass, Sprinkle, Anderson & Citkowski, P.C.

(57) ABSTRACT

A seal for a sliding glass window includes a sliding glass guide and an elastomeric channel member that is at least partially disposed within the sliding glass guide. Located between the elastomeric channel member and the sliding glass guide is an electroactive actuator that is operable to change its shape from a first shape to a second shape, or vice versa, when a voltage is applied thereto. The first shape of the electroactive actuator pushes the elastomeric channel member towards the sliding glass window and the second shape pulls the elastomeric channel member away from the sliding glass window.

5 Claims, 1 Drawing Sheet

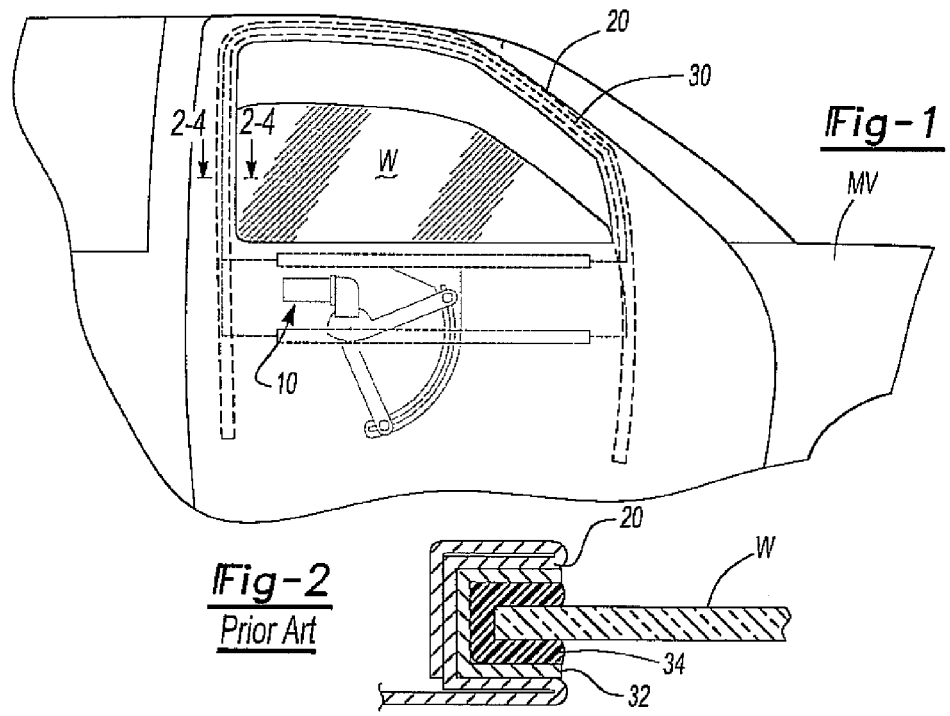
Fig-1
Fig-2
Prior Art
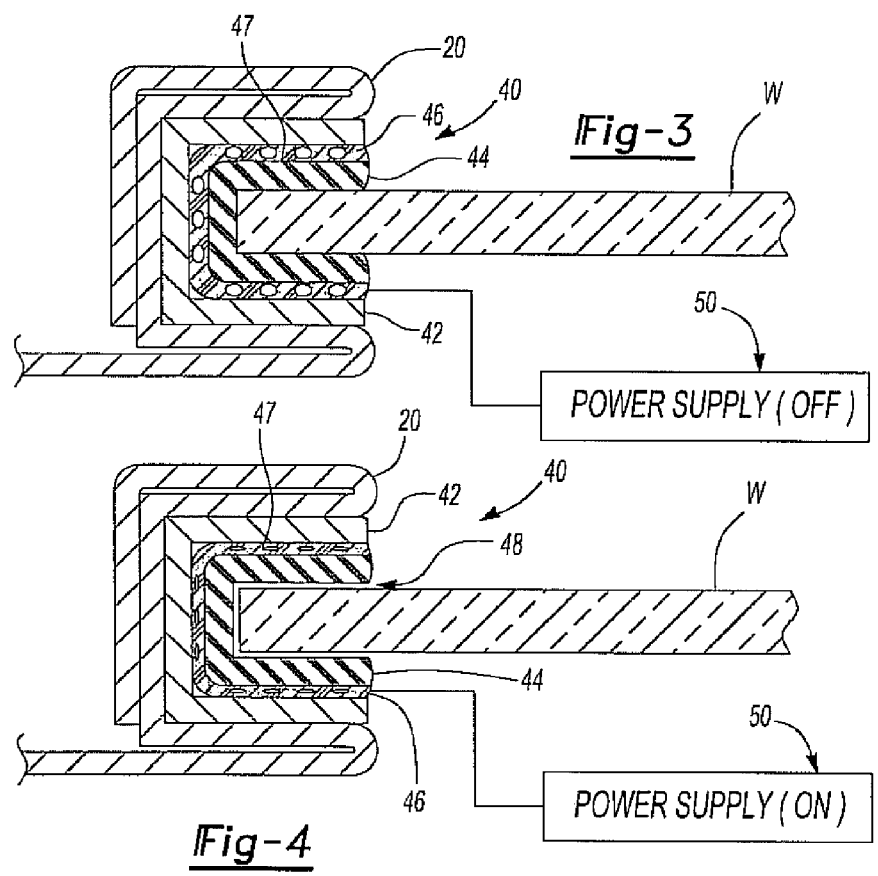
Fig-3
Fig-4

SEAL HAVING AN ELECTROACTIVE ACTUATOR A FOR SLIDING GLASS WINDOW

FIELD OF THE INVENTION

This invention relates generally to a seal for a sliding glass window and more particularly to a seal having an electroactive actuator for a sliding glass window.

BACKGROUND OF THE INVENTION

The use of sliding glass windows is common, in particular with motor vehicles. Such windows use a motor in combination with a window switch to slide the window from a closed position to a plurality of open positions. Around the outer edge of at least part of the window pane is a seal that provides a desirable watertight and in some instances airtight seal around the window pane. The seal allows for an edge portion of the window pane to fit at least partially within and provides contact therebetween in order to prevent water, air and the like from passing between the seal and the window pane. However, the seal between the window and the seal material results in a frictional force that must be overcome when the window is moved from a stationary position. Thus the better the seal, the higher the friction between the seal material and the window, and thus the greater the power required to move the window. An increase in the power required to move the window is in contradiction to desirable lightweight motors that have minimal electrical, hydraulic or pneumatic input power requirements. As such, a seal that affords for a decrease in friction prior to moving the window from a stationary position would be desirable.

SUMMARY OF THE INVENTION

A seal for a sliding glass window is provided. The seal can include a sliding glass guide and an elastomeric channel member that is at least partially within the sliding glass guide. Located between the elastomeric channel member and the sliding glass guide can be an electroactive actuator that is operable to change its shape when a voltage is applied thereto. Also included can be an electrical source of power that is connected to the electroactive actuator. In some instances, the electroactive actuator is an electroactive polymer and can be a dielectric electroactive polymer or an ionic electroactive polymer. If the electroactive polymer is a dielectric electroactive polymer, it can be made from silicones and/or acrylic elastomers.

The seal for the sliding glass window provides for a generally tight seal pressure against the window pane when the window is stationary and a generally loose seal pressure against the window pane when the window is moving. The difference in seal pressure is provided by the electroactive actuator that is located between the sliding glass guide and the elastomeric channel member when a predetermined voltage is applied to the electroactive actuator and the actuator changes shape and results in the elastomeric channel member being moved relative to the window pane. It is appreciated that the seal is provided such that movement of the sliding glass window afforded through the use of a window switch occurs during or after activation of the electroactive actuator and subsequent movement of the seal material relative to the window pane.

Also included is a process for moving a sliding glass window from a stationary position, the process including providing a window frame and a window seal assembly located at least partially within the window frame. The window seal assembly can include the sliding glass guide, the elastomeric channel member, the electroactive actuator and the electrical source of power. The process also includes providing a window pane that is at least partially within the elastomeric channel member and providing a window motor that is operable to move the window pane from a closed position to a plurality of open positions. A window switch can be included and is operable to energize the window motor and allow voltage from the electrical source of power to be applied to the electroactive actuator. Operation of the window switch affords for the voltage to be applied to the electroactive actuator which results in a change of its shape and movement of the seal material relative to the window pane, concurrently with or followed by the window motor being energized and the window pane being moved from a stationary position.

BRIEF DESCRIPTION OF THE DRAWINGS

FIG. 1 is a schematic side view of a sliding glass window;
FIG. 2 is a cross-sectional view of a prior art window seal;
FIG. 3 is a cross-sectional view of a window seal according to an embodiment of the present invention; and
FIG. 4 is a cross-sectional view of the embodiment shown in FIG. 3 when voltage is applied to the seal.

DETAILED DESCRIPTION OF THE INVENTION

The present invention discloses a seal for a sliding glass window and a process for moving a sliding glass from a stationary position. As such, the seal has utility as a component for a motor vehicle and the process has utility for how to use a component of the motor vehicle.

The seal can include a sliding glass guide that is shaped and dimensioned such that an elastomeric channel member can be located at least partially within. The elastomeric channel member is shaped and dimensioned such that an edge portion of a window pane can fit therewithin. Between the sliding glass guide and the elastomeric channel member, an electroactive actuator is located, the electroactive actuator having an electrical source of power connected thereto. It is appreciated that the elastomeric channel member can come into contact with the edge portion of the window pane and provide a seal.

In some instances, the electroactive actuator is attached to the elastomeric channel member and/or the sliding glass guide. In addition, the electroactive actuator is operable to change its shape when a voltage is applied to the material. Thus by being attached to the sliding glass guide and the elastomeric channel member, and when voltage is applied to the electroactive actuator, subsequent movement of the elastomeric channel member relative to the window pane is afforded. In some instances, the elastomeric channel member is move or pulled away from the window pane.

In some instances, the electroactive actuator is made from an electroactive polymer. Electroactive polymers are polymers that can change shape when a voltage is applied thereto. Such polymers can be used as actuators or sensors and can undergo a large amount of deformation while sustaining large forces. In general, electroactive polymers can be divided into two principal classes, one class being dielectric electroactive polymers and the other class being ionic electroactive polymers. Dielectric electroactive polymers can be actuated by electrostatic forces between two electrodes and result in the squeezing of the polymer therebetween. In contrast, ionic electroactive polymers are actuated by the displacement of ions within the polymer. In some instances, electroactive polymers can produce large strains up to 300% and may or may not need continuous electrical power to keep the material at a given position or shape. In the present disclosure, the electroactive polymer can be a dielectric electroactive polymer or an ionic electroactive polymer. If the electroactive polymer is a dielectric electroactive polymer, the material can be made from silicones and/or acrylic elastomers.

A process for moving a sliding glass window from a stationary position can include providing a window frame and a window seal assembly. It is appreciated that the window seal assembly is located at least partially within the window frame. The window seal assembly can include the sliding glass guide, the elastomeric channel member, the electroactive actuator and the electrical source of power connected to the electroactive actuator as described above. Also included within the process can be providing a window pane that is at least partially within the elastomeric channel member of the window seal assembly and a window motor that provides movement of the window pane from a closed position to a plurality of open positions. Electrically connected to the window motor is a window switch that can energize the window motor. In some instances the window switch affords for voltage from the electrical source of power to be applied to the electroactive actuator.

Upon operation, the window switch is activated and results in a predetermined voltage being applied to the electroactive actuator, movement of the elastomeric channel member relative to the window pane and concurrent or subsequent movement of the window pane by the window motor. In this manner, reduced friction between the elastomeric channel member and the window pane is provided prior to movement of the window pane from a stationary position.

Turning now to FIG. 1, a sliding glass window W is shown as part of a motor vehicle MV. As part of a sliding glass window assembly, a window frame 20 can be included along with a window seal assembly 30. As shown in FIG. 2, prior art window seal assemblies can include a sliding glass guide 32 that is located at least partially within the window frame 20 and an elastomeric channel member 34 that is at least partially within the sliding glass guide 32. As illustrated in FIG. 2, the window pane W and the elastomeric channel member 34 are dimensioned such that the window pane can fit at least partially within the channel member 34 and provide a seal therebetween. It is with this type of window seal that friction between the elastomeric channel member 34 and the window pane W must be overcome in order for the window motor 10 to move the window W from a stationary position.

Turning now to FIGS. 3 and 4, an embodiment of a seal is shown. In some instances, the same window frame 20 can be used with a sliding glass guide 42 at least partially located therewithin. It is appreciated that the sliding glass guide 42 may or may not be the same as the sliding glass guide 32 used in prior art structures. Located adjacent to the window W can be an elastomeric channel member 44 that is dimensioned such that an edge portion of the window pane W can fit at least partially therewithin. It is also appreciated from FIGS. 3 and 4 that the edge portion of the window pane W has an edge surface and a pair of generally parallel side surfaces extending from the edge surface. Between the sliding glass guide 42 and the elastomeric channel member 44 is an electroactive actuator 46. Electrically connected to the electroactive actuator is a power supply 50. As shown in FIG. 3 and for illustrative purposes only, when the power supply 50 is off, the electroactive actuator 46 is in a relaxed state and has a thickness such that the elastomeric channel member 44 is at least partially in contact with the window pane W and provides a desirable seal between the elastomeric channel member 44 and the window pane W. Stated differently, it is appreciated from FIG. 3 that the electroactive actuator 46 can push the elastomeric channel member 44 such that it engages and seals against the edge surface and the pair of generally parallel side surfaces extending from the edge surface when in the relaxed state. However, when the power supply 50 is on as illustrated in FIG. 4, the electroactive actuator 46 changes its shape and thereby results in movement of the elastomeric channel member 44 relative to the window pane W, e.g. disengage and move away from the edge surface and the generally parallel side surfaces extending from the edge surface.

In some instances, the elastomeric channel member 44 can be pulled away from the window pane W and result in a gap 48 therebetween.

The elastomeric channel member 44 can have a sliding glass guide side 47 and the electroactive actuator 46 can be attached to the sliding glass guide 42 and the sliding glass guide side 47 of the elastomeric channel member 44. When the power supply 50 is on, a predetermined voltage is provided to the electroactive actuator 46 and a thickness of the electroactive actuator material decreases and the elastomeric channel member 44 can be pulled away from the window pane W. In this manner, the friction between the elastomeric channel member 44 and the window pane W is reduced. It is appreciated that complete separation between the elastomeric channel member 44 and the window pane W in order to provide the gap 48 is not required so long as the friction between the elastomeric channel member 44 and the window pane W is reduced. For example, any movement of the elastomeric channel member 44 relative to the window pane W can afford for reduced friction therebetween. It is further appreciated from the drawings that the electroactive actuator 46 surrounds the edge portion of the window pane W.

The sliding glass guide 42 can be made from any material known to those skilled in the art, illustratively including metals, alloys, plastics, composites and the like. The elastomeric channel member 44 can be made from any elastomeric material known to those skilled in the art so long as it is suitable for use with a sliding glass window. The electroactive actuator 46 can be an electroactive polymer. The electroactive polymer can be a dielectric electroactive polymer and/or an ionic electroactive polymer. If the electroactive polymer is made from a dielectric electroactive polymer, this polymer can be made from silicones and/or acrylic elastomers.

It is appreciated that the seal 40 can be assembled with the window pane W and the surrounding structure such that activation of the window movement device 10 also results in the application of the voltage to the electroactive actuator 46. In some instances, the activation of a window switch (not shown) can result in the supply of the voltage to the electroactive actuator 46 followed by the activation of the window movement device 10 such that the elastomeric channel member 44 is pulled away from the window pane W before movement of the window pane W is initiated. In this manner, a seal for a sliding glass window that provides reduced friction between the seal and the window just prior to and/or during movement of the window is provided.

The invention is not restricted to the illustrative examples described above. The examples are not intended as limitations on the scope of the invention. Processes, apparatus, compositions and the like described herein are exemplary and not intended as limitations on the scope of the invention. Changes therein and other uses will occur to those skilled in the art. The scope of the invention is defined by the scope of the claims.

I claim:

1. A seal for a sliding glass window, said seal comprising:
a sliding glass guide;

an elastomeric channel member at least partially disposed within said sliding glass guide;

said sliding glass window having an edge portion said edge portion having an edge surface and a pair of generally parallel side surfaces extending from said edge surface said edge portion located within said sliding glass guide and said elastomeric channel member;

an electroactive actuator surrounding said edge portion of said sliding glass window and located between and attached to said sliding glass guide and said elastomeric channel member, said electroactive actuator having a first shape and a second shape; and an electrical source of power connected to said electroactive actuator and operable to apply voltage thereto, said applied voltage changing said electroactive actuator from said first shape to said second shape or vice-versa;

wherein said first shape of said electroactive actuator pushes said elastomeric channel member towards said sliding glass window to engage and seal against said edge surface and said pair of generally parallel side surfaces extending from said edge surface and said second shape of said electroactive actuator pulls said elastomeric channel member away from said sliding glass window to disengage said edge surface and said pair of generally parallel side surfaces extending from said edge surface.

2. The seal of claim 1, wherein said electroactive actuator is an electroactive polymer.

3. The seal of claim 2, wherein said electroactive polymer is a dielectric electroactive polymer.

4. The seal of claim 3, wherein said dielectric electroactive polymer is a polymer selected from the group consisting of silicones and acrylic elastomers.

5. The seal of claim 2, wherein said electroactive polymer is an ionic electroactive polymer.

* * * * *